United States Patent
Kang et al.

(10) Patent No.: US 8,904,438 B2
(45) Date of Patent: Dec. 2, 2014

(54) APPARATUS AND METHOD FOR PROVIDING MINI ELECTRONIC PROGRAM GUIDE INFORMATION IN A DIGITAL BROADCAST RECEIVER

(75) Inventors: Chang-Hwan Kang, Seoul (KR); Jun-Won Seo, Gyeonggi-do (KR)

(73) Assignee: Alticast Corp., Seocho-dong, Seocho-gu, Seoul (KR)

( * ) Notice: Subject to any disclaimer, the term of this patent is extended or adjusted under 35 U.S.C. 154(b) by 649 days.

(21) Appl. No.: 12/804,843

(22) Filed: Jul. 30, 2010

(65) Prior Publication Data

US 2011/0030008 A1  Feb. 3, 2011

(30) Foreign Application Priority Data

Jul. 31, 2009 (KR) .................. 10-2009-0070921

(51) Int. Cl.
- *H04N 5/445* (2011.01)
- *H04N 21/482* (2011.01)
- *H04N 21/431* (2011.01)
- *H04N 21/443* (2011.01)

(52) U.S. Cl.
CPC ......... *H04N 5/44543* (2013.01); *H04N 21/482* (2013.01); *H04N 21/4316* (2013.01); *H04N 21/4438* (2013.01)
USPC .................. 725/43; 725/40; 725/47

(58) Field of Classification Search
CPC ...................... H04N 21/23109; H04N 21/4221
USPC .................................... 725/43, 40, 47
See application file for complete search history.

(56) References Cited

U.S. PATENT DOCUMENTS

| | | | | |
|---|---|---|---|---|
| 5,844,620 | A  * | 12/1998 | Coleman et al. | 725/54 |
| 6,008,803 | A  * | 12/1999 | Rowe et al. | 348/E5.105 |
| 7,577,973 | B1* | 8/2009 | Kapner et al. | 725/44 |
| 2001/0027475 | A1* | 10/2001 | Givol et al. | 709/204 |
| 2005/0125827 | A1* | 6/2005 | Moreau et al. | 725/52 |
| 2007/0162936 | A1* | 7/2007 | Stallings et al. | 725/58 |
| 2008/0052742 | A1* | 2/2008 | Kopf et al. | 725/34 |
| 2008/0313672 | A1* | 12/2008 | Migos et al. | 725/40 |
| 2009/0049474 | A1* | 2/2009 | Jinseok | 725/43 |
| 2009/0235312 | A1* | 9/2009 | Morad et al. | 725/44 |
| 2009/0241144 | A1* | 9/2009 | LaJoie et al. | 725/40 |
| 2009/0271823 | A1* | 10/2009 | Jung et al. | 725/39 |
| 2010/0251304 | A1* | 9/2010 | Donoghue et al. | 725/46 |

* cited by examiner

*Primary Examiner* — Pankaj Kumar
*Assistant Examiner* — Franklin Adramuno
(74) *Attorney, Agent, or Firm* — Cha & Reiter, LLC

(57) ABSTRACT

A method and apparatus for providing Electronic Program Guide (EPG) information in a digital broadcast receiver, in which upon receipt of a request for EPG information from a viewer in a situation where specific broadcast content is being broadcasted, at least one pop-up window is sequentially activated in a partial region of a full screen, and at least one of the specific broadcast content and EPG information about broadcast content selected by the viewer is displayed on each of the activated at least one pop-up window.

20 Claims, 11 Drawing Sheets
(5 of 11 Drawing Sheet(s) Filed in Color)

APPARATUS AND METHOD FOR PROVIDING MINI ELECTRONIC PROGRAM GUIDE INFORMATION IN A DIGITAL BROADCAST RECEIVER

CLAIM OF PRIORITY

This application claims priority from Korean Patent Application No. 10-2009-0070921 filed in the Korean Intellectual Property Office on Jul. 31, 2009, the entire disclosure of which is hereby incorporated by reference.

BACKGROUND

1. Field

The exemplary embodiments generally relate to an apparatus and method for providing mini Electronic Program Guide (EPG) information in a digital broadcast receiver. More particularly, exemplary embodiments relate to an apparatus and method for providing a plurality of mini EPG information step by step.

2. Description of the Related Art

Digital broadcast services have been developed to allow viewers to freely select and watch broadcast content supporting high-quality video and audio, any time they want.

Digital broadcast systems supporting these digital broadcast services provide not only a variety of broadcast content but also EPG information including information about the broadcast content.

The EPG information is provided to digital broadcast receivers by a digital broadcast server. The EPG information may be updated by the change in the broadcast content provided by the digital broadcast server. The digital broadcast receiver stores EPG information provided from the digital broadcast server, and upon request of a viewer, processes the EPG information and displays its associated EPG screen.

The EPG information displayed by the digital broadcast receiver may include information about the broadcast content the receiver is presently receiving, and/or with the broadcast content selected by a viewer.

A viewer watching digital broadcasts using the digital broadcast receiver can search a variety of broadcast content and select the broadcast content he or she desires to receive, on an EPG screen displayed by the digital broadcast receiver.

Therefore, the digital broadcast receiver has long been required to make an EPG screen on which the viewer not only can quickly and easily search the desired broadcast content but also can easily select the searched broadcast content.

SUMMARY

An aspect of exemplary embodiments of the present invention is to address at least the above-mentioned problems and/or disadvantages and to provide at least the advantages described below. Accordingly, an aspect of the present invention is to provide an apparatus and method capable of sequentially providing EPG information on a plurality of pop-up windows using a mini EPG function in a digital broadcast receiver.

Another aspect of exemplary embodiments of the present invention is to provide an apparatus and method for combining a mini EPG function with a Picture-In-Picture (PIP) function and displaying, on a PIP window, broadcast content corresponding to EPG information displayed on a main pop-up window among a plurality of pop-up windows in a digital broadcast receiver.

A further another aspect of exemplary embodiments of the present invention is to provide an apparatus and method in which, upon receipt of a viewer's request for processing delay of a predetermined time or more in performing a specific function, a digital broadcast receiver notifies the receipt of the viewer's request.

In accordance with one aspect of exemplary embodiments of the present invention, there is provided a method for providing Electronic Program Guide (EPG) information in a digital broadcast receiver, in which upon receipt of a request for EPG information from a viewer in a situation where specific broadcast content is being broadcasted, at least one pop-up window is sequentially activated in a partial region of a full screen, and at least one of the specific broadcast content and EPG information about broadcast content selected by the viewer is displayed on each of the activated at least one pop-up window.

In accordance with another aspect of exemplary embodiments of the present invention, there is provided a digital broadcast receiver for providing Electronic Program Guide (EPG) information, in which a user interface unit monitors whether a request for EPG information is received from a viewer in a situation where specific broadcast content is being broadcasted, an information processor, upon receipt of a request for EPG information from the viewer, performs control to sequentially activate at least one pop-up window in a partial region of a full screen, and to display at least one of the specific broadcast content and EPG information about broadcast content selected by the viewer, on each of the activated at least one pop-up window, and a display displays EPG information provided from the information processor.

BRIEF DESCRIPTION OF THE DRAWINGS

The patent application file contains at least one drawing executed in color. Copies of this patent with color drawings will be provided by the Office upon request and payment of the necessary fee.

The above and other features and aspects of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

A digital broadcast receiver to which exemplary embodiments of the present invention may be applied, may be construed to refer to any receivers capable of receiving digital broadcasts through a variety of communication media. For example, in a case where wireless networks such as a satellite network and a terrestrial network are used as the communication media, the digital broadcast receiver may be a mobile terminal capable of receiving digital broadcasts, and in a case where wired networks such as a cable network are used as the communication media, the digital broadcast receiver may be a set-top box capable of receiving digital broadcasts.

Meanwhile, the typical digital broadcast services provided over the wired networks include Internet Protocol Television (IP TV) services, while the typical digital broadcast services provided over the wireless networks include Digital Multimedia Broadcasting (DMB) services.

In describing embodiments of the present invention, the term "broadcast content" may be construed to include all of broadcast programs, applications, and so forth, provided for digital broadcast services.

In an exemplary embodiment of the present invention described below, a detailed description will be made of a method for more efficiently providing EPG information to a viewer in a situation where the viewer is watching a digital broadcast service. That is, in an exemplary embodiment of the present invention, EPG information may be displayed step by step on pop-up windows which are sequentially opened upon request of a viewer. Preferably, the pop-up windows support a mini EPG function.

Now, detailed description will be made of the structure and operation of a digital broadcast receiver to which the present invention is to be applied, and various examples in which EPG information is displayed by the digital broadcast receiver.

A. Digital Broadcast Receiver

Now, the structure and operation of a digital broadcast receiver, to which exemplary embodiments of the present invention are to be applied, will be described in detail with reference to the accompanying drawing.

Figure 1:
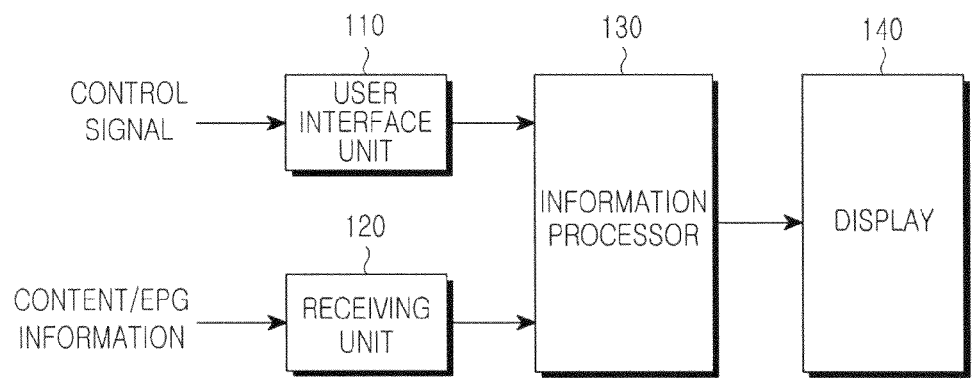
FIG. 1 is a block diagram showing a structure of a digital broadcast receiver according to an embodiment of the present invention.

FIG. 1 shows a structure of a digital broadcast receiver according to an embodiment of the present invention.

Referring to FIG. 1, a user interface unit 110 detects a control signal provided from a viewer, and delivers the detected control signal to an information processor 130.

The method of receiving a control signal provided from a viewer may be different according to the type of a user interface. For example, if the type of the user interface is an infrared communication user interface, the viewer will input a control signal using external control means such as a remote controller. However, if the type of the user interface is a direct-input user interface, the viewer may input a control signal by directly manipulating keys provided on a touch screen or a digital broadcast receiver.

The control signal that can be input from the viewer may be diverse. The control signal may include all control-related control signals the viewer uses to control an operation of the digital broadcast receiver, such as, typically, a channel switching request and an EPG information request.

A receiving unit 120 receives not only broadcast content information but also additional service information including EPG information, which are provided from a digital broadcast server over all communication networks capable of supporting digital broadcast services. The receiving unit 120 delivers the information received for digital broadcast services to the information processor 130.

A communication system supported by the receiving unit 120 may be defined according to the type of a network over which the additional service information including EPG information and the broadcast content are transmitted. For example, the communication system may include cable network-based communication, satellite communication, and terrestrial communication.

If a select signal for the broadcast content the viewer desires to watch is received from the viewer through the user interface unit 110, the information processor 130 requests the digital broadcast server to provide the broadcast content, by means of a transmitting unit (not shown).

Besides, the information processor 130 performs various functions the viewer requests using the user interface unit 110 in a situation where specific broadcast content is being provided.

In addition, the information processor 130 receives broadcast content information desired by the viewer through the receiving unit 120, processes the received broadcast content information in a displayable format, and delivers the processed information to a display 140.

More specifically, the information processor 130 receives a request for EPG information from the viewer through the user interface unit 110 in the situation where specific broadcast content is being provided. The information processor 130 processes EPG information provided through the receiving unit 120, and controls the display 140 so that the EPG information desired by the viewer may be displayed in the format proposed in an embodiment of the present invention.

For example, if the request for EPG information is an initial request, the information processor 130 instructs the display 140 to open a main pop-up window in a partial region of the full screen on which specific broadcast content is being provided. The information processor 130 controls the display 140 to display the requested EPG information on the main pop-up window, together with EPG information about the specific broadcast content.

Thereafter, if a change request for the EPG information displayed on the main pop-up window is received from the viewer through the user interface unit 110, the information processor 130 controls the display 140 to change the EPG information displayed on the main pop-up window, together with the EPG information about the broadcast content selected by the change request.

In other words, the information processor 130 controls the display 140 so that EPG information about the current content of a channel that is sequentially changed by the viewer's channel switching request provided through the user interface unit 110 may be displayed on the main pop-up window.

The information processor 130 delivers to the display 140 the broadcast content information that is serviced in the channel, switching to which is to be made by the viewer's channel switching request, thereby causing the broadcast content displayed on the full screen to be changed.

As another example, the information processor 130 opens a PIP window for providing a PIP function, together with the main pop-up window, and controls the display 140 so that broadcast content corresponding to the EPG information displayed on the main pop-up window may be displayed on the PIP window. For example, the PIP window may be placed in series in the right region of the main pop-up window.

If an expansion request is received from the viewer through the user interface unit 110 with the main pop-up window open, the information processor 130 instructs the display 140 to open a first sub pop-up window connecting with the main pop-up window. Further, the information processor 130 controls the display 140 to display new EPG information on the first sub pop-up window.

For example, the new EPG information to be displayed on the first sub pop-up window may include one of EPG information about the broadcast content to be serviced next in the channel providing the broadcast content corresponding to the EPG information displayed on the main pop-up window, EPG information about the broadcast content similar in type to the broadcast content corresponding to the EPG information displayed on the main pop-up window, and EPG information which is more detailed than the EPG information displayed on the main pop-up window.

If an expansion request is additionally received from the viewer through the user interface unit 110 with the first sub pop-up window open, the information processor 130 instructs the display 140 to open a new second sub pop-up window connecting with the first sub pop-up window. Further, the information processor 130 controls the display 140 to display new EPG information on the second sub pop-up window.

For example, as to the new EPG information to be displayed on the second sub pop-up window, the display 140 may sequentially display information about next broadcast contents of the channel providing the broadcast content corresponding to the EPG information displayed on the main pop-up window. The display 140 may display the full broadcast schedule of the channel at stated periods while sequentially displaying information about the next broadcast contents on the second sub pop-up window.

If an active key input from the viewer is detected through the user interface unit 110, the information processor 130 controls the display 140 so that a mark for indicating the detection of the active key input may be displayed in a pre-designated region on the full screen. The 'active key' as used herein refers to a key requiring a specific function by means of the digital broadcast receiver. Preferably, in an embodiment of the present invention, if a processing delay time required to process a specific function exceeds a threshold time, the digital broadcast receiver may designate a key requesting the specific function as an active key.

The display 140, under the control of the information processor 130, opens a main pop-up window and at least one sub pop-up window as well as a PIP window, and displays broadcast content information and EPG information provided from the information processor 130 on any one of the full screen, the main pop-up window, the sub pop-up window(s), and the PIP window.

Meanwhile, by controlling the display 140, the information processor 130 may increase the number of sub pop-up windows to be displayed. That is, the number of sub pop-up windows displayed according to an embodiment of the present invention is not limited to 2, but can be increased if necessary.

The information processor 130 may select any one of a plurality of windows upon request of the viewer with the plurality of windows open, including the main pop-up window, and control the display 140 so that the selected window may be activated.

As an example of a method for displaying a main pop-up window and a plurality of sub pop-up windows, the main pop-up window and the plurality of sub pop-up windows are expanded to be spread rightward in a partial region of the left bottom on the full screen, and displayed such that they connect with one another. If the PIP function is additionally applied, the PIP window is expanded to be coupled to the left side of the main pop-up window.

The main pop-up window, the sub pop-up windows and the PIP window, which have been activated by the above-described operation, may disappear (be closed) upon request of the viewers. For example, in a situation where a main pop-up window, two sub pop-up windows and one PIP window are activated, the viewer may instruct to close one of the activated windows. Preferably, however, the activated windows may be set to be closed in reverse order of activation.

In addition, the information processor 130 may remove the mark displayed to indicate detection of the active key input, at the time an operation of the related function has been completed, or after a predetermined time has elapsed since the display of the mark. The predetermined time that has elapsed after the display of the mark needs to be sufficient for the viewer to recognize receipt of a relevant request.

B. Embodiments

Now, exemplary embodiments for displaying EPG information by the digital broadcast receiver will be described in detail.

An exemplary embodiment of the present invention provides a scheme of displaying EPG information using a main pop-up window and a plurality of sub pop-up windows, in which broadcast content corresponding to EPG information selected through the main pop-up window is displayed on the full screen.

Another embodiment of the present invention provides a scheme in which in combination with a PIP function, EPG information is displayed using a main pop-up window and a plurality of sub pop-up windows, and broadcast content corresponding to EPG information selected through the main pop-up window may be displayed on a PIP window provided for the PIP function.

Finally, as a function that can be applied in common to the embodiments of the present invention, a new scheme may be provided that, upon receipt of an active key by a viewer, informs the viewer of recognition of the active key.

While a plurality of sub pop-up windows will be considered in the embodiments described below, it is apparent to those skilled in the art that the same may be applied even when EPG information is displayed using one sub pop-up window.

B-1. First Embodiment

Figure 2:
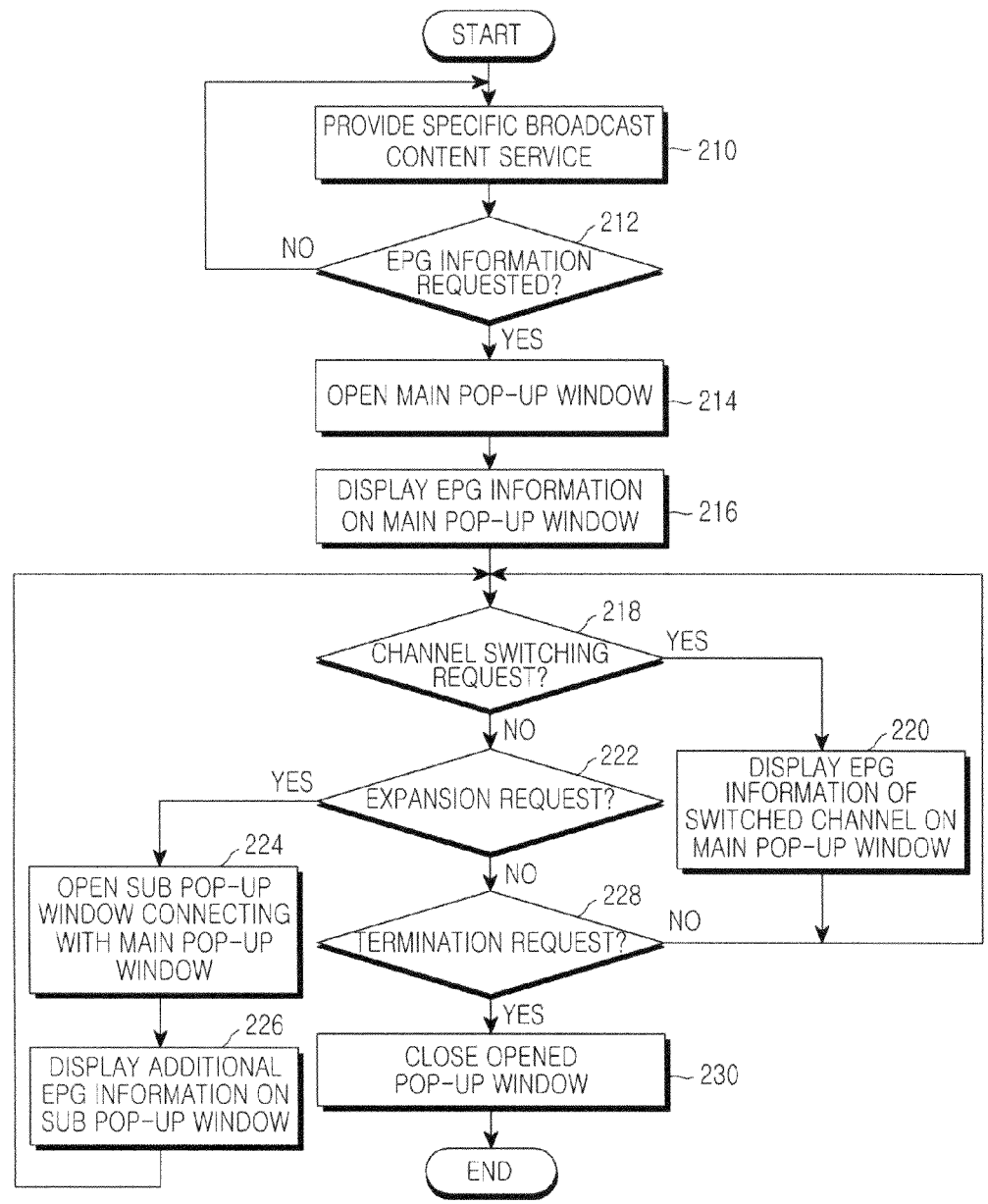
FIG. 2 is a flowchart showing a control flow for displaying EPG information in a digital broadcast receiver according to an embodiment of the present invention.

FIG. 2 shows a control flow for displaying EPG information in a digital broadcast receiver according to an embodiment of the present invention.

Referring to FIG. 2, in step 210, a digital broadcast receiver provides a service for specific broadcast content requested by a viewer. The digital broadcast receiver determines in step 212 whether a request for EPG information is received from the viewer in a situation where the service for the specific broadcast content is being provided.

If the request for EPG information is received from the viewer, the digital broadcast receiver opens a main pop-up window in step 214. Subsequently, the digital broadcast receiver displays EPG information on the opened main pop-up window in step 216. The displayed EPG information is EPG information about the broadcast content that is currently being serviced on the full screen.

Figure 3A:
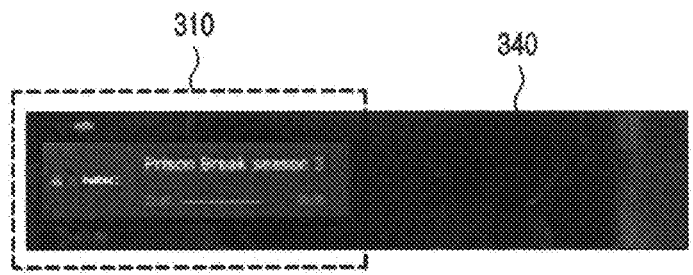
FIGS. 3A to 3D are diagrams showing examples of displaying mini EPG information in a digital broadcast receiver according to an embodiment of the present invention.

FIG. 3A shows an example in which a main pop-up window 310 is opened on a full screen 340 on which specific broadcast content is being displayed by the digital broadcast receiver, and mini EPG information is displayed on the opened main pop-up window 310. It can be appreciated in FIG. 3A that on the main pop-up window 310 are displayed "Prison Break season 3" indicating the broadcast content currently being serviced and information indicating the current progress of the service. In the example of FIG. 3A, the main pop-up window 310 is opened at the left bottom of the full screen 340. It should be noted that the full screen 340 shown in FIG. 3A shows only the cut image on the bottom of the actual full screen.

The digital broadcast receiver monitors in step 218 whether a channel switching request is received from the viewer, monitors in step 222 whether expansion of the pop-up window is requested by the viewer, and monitors in step 228 whether termination of the function for providing EPG information is requested by the viewer.

If channel switching is requested in step 218, the digital broadcast receiver displays, on the main pop-up window, EPG information about broadcast content provided in the channel, switching to which is requested by the viewer, in step 220. That is, the digital broadcast receiver changes EPG information displayed on the main pop-up window upon the viewer's request. Even for the broadcast content displayed on the full screen, the digital broadcast receiver may display the broadcast content provided in the switched channel.

Through steps 218 to 220, the digital broadcast receiver may repeatedly change EPG information displayed on the main pop-up window in response to the viewer's channel switching request.

If an expansion request for the pop-up window is received from the viewer in step 222, the digital broadcast receiver opens a sub pop-up window expanding from the main pop-up window in step 224. The expansion of the sub pop-up window may be made in any one of the top, bottom, left and right directions of the previously opened main pop-up window or sub pop-up window.

In step 226, the digital broadcast receiver displays additional EPG information on the opened sub pop-up window. New EPG information to be displayed on the newly opened sub pop-up window may be defined in a variety of ways. Typically, the new EPG information may include EPG information about the broadcast content to be provided next in the channel providing the broadcast content corresponding to the EPG information displayed on the main pop-up window. As another example, the new EPG information may include more detailed EPG information regarding the broadcast content corresponding to the EPG information displayed on the main pop-up window.

Figure 3B:

FIG. 3B shows an example in which a first sub pop-up window 320 expands from the main pop-up window upon the viewer's request. According to FIG. 3B, on the first sub pop-up window 320 expanding from the main pop-up window is displayed schedule information indicating that broadcast content corresponding to the EPG information displayed on the main pop-up window is to be serviced next.

By repeating steps 222 to 226, the digital broadcast receiver may open a plurality of sub pop-up windows and provide different EPG information on each of the opened sub pop-up windows.

To be sure, EPG information displayed on the sub pop-up window can be realized in a variety of forms according to the type of information provided in the broadcast server. For example, information about advertisements related to the currently provided content may be displayed on the sub pop-up window.

Figure 3C:
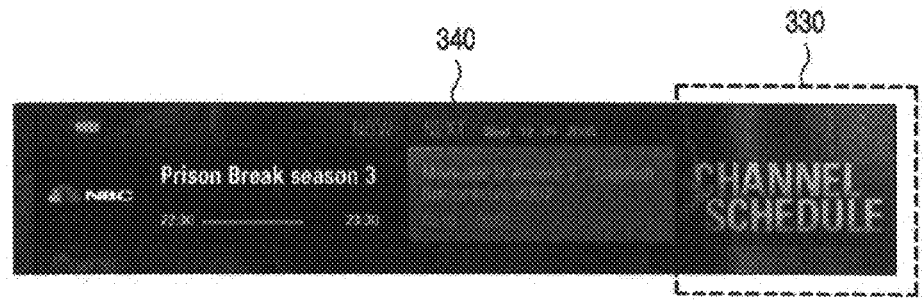

FIG. 3C shows an example in which after information is displayed on the first sub pop-up window, a second sub pop-up window 330 displaying new EPG information is expanded upon the viewer's request. According to FIG. 3C, on the second sub pop-up window 330 expanding from the first sub pop-up window is displayed schedule information indicating broadcast content to be provided later in the channel providing the broadcast content corresponding to the EPG information displayed on the main pop-up window. That is, as to EPG information to be displayed on the second sub pop-up window, information about broadcast content to be provided later in the channel presently providing the broadcast content is sequentially displayed in order of scheduled time. The second sub pop-up window may be set to display all or part of the broadcast content to be provided in the channel, at stated periods or at random.

Figure 3D:
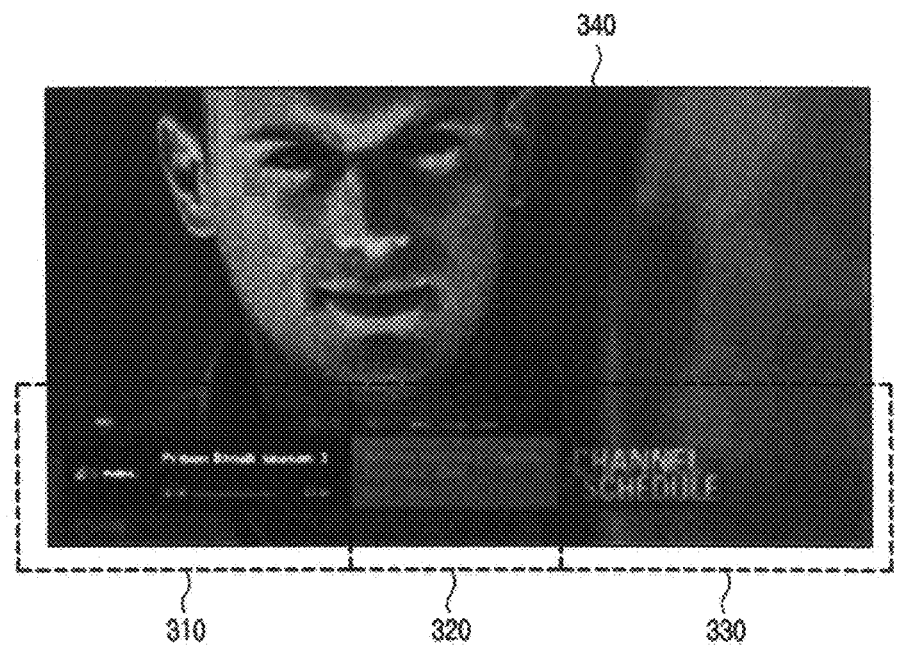

FIG. 3D shows an example in which EPG information is all provided on a full screen 340 through a main pop-up window 310 and two sub pop-up windows 320 and 330 according to an embodiment of the present invention.

If termination of the function providing EPG information is requested by the viewer in step 228, the digital broadcast receiver closes all of the currently opened pop-up windows in step 230. However, with a plurality of pop-up windows open, the digital broadcast receiver may sequentially close the pop-up windows in reverse order of being opened, upon request of the viewer.

FIGS. 8A to 8C and FIGS. 9A and 9B show various examples of displaying pop-up windows according to an embodiment of the present invention.

Figure 8A:
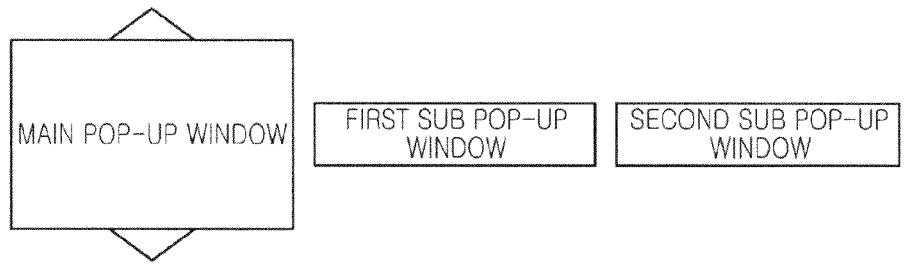
FIGS. 8A to 8C and FIGS. 9A and 9B are diagrams showing examples of separately displaying an activated pop-up window and other pop-up windows according to an embodiment of the present invention.
Figure 8B:
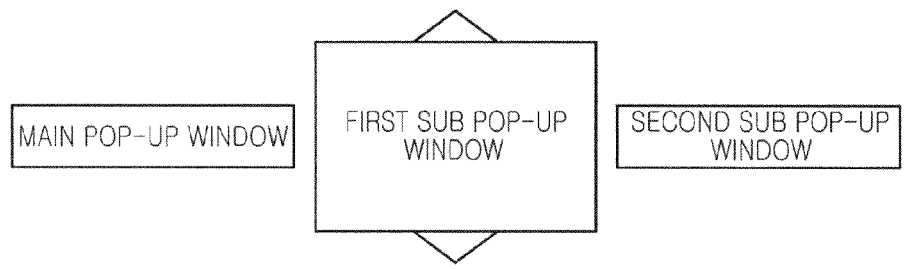
Figure 8C:
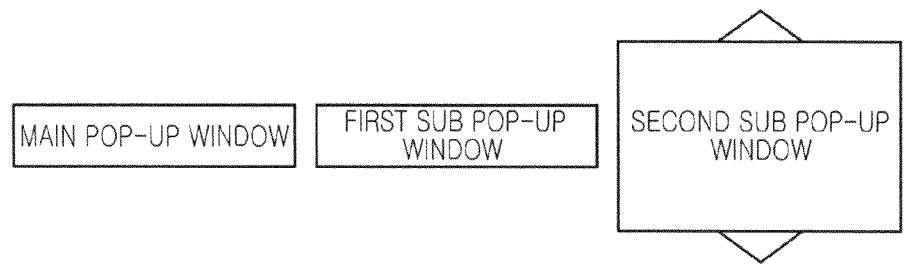

FIGS. 8A to 8C show examples in which a pop-up window is selected by a viewer from among a main pop-up window and two sub pop-up windows and then focused to be distinguished from other pop-up windows.

More specifically, FIG. 8A shows an example in which when a main pop-up window is focused by being selected by the viewer, the main pop-up window is enlarged to be distinguished from two sub pop-up windows.

FIG. 8B shows an example in which when a first sub pop-up window is focused by being selected by the viewer, the first sub pop-up window is enlarged to be distinguished from a main pop-up window and the other sub pop-up window.

FIG. 8C shows an example in which when a second sub pop-up window is focused by being selected by the viewer, the second sub pop-up window is enlarged to be distinguished from a main pop-up window and the other sub pop-up window.

Figure 9A:
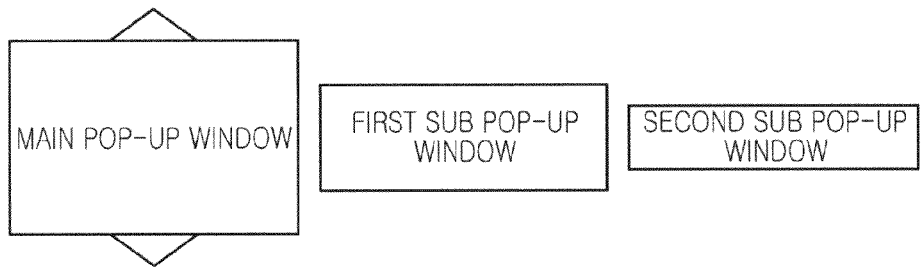
Figure 9B:
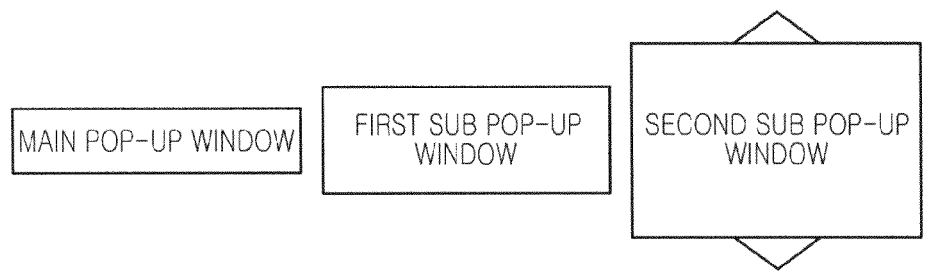

FIGS. 9A and 9B show examples in which except for one of a main pop-up window and two sub Pop-up windows, to be focused by being selected by the viewer, even the other pop-up windows are distinguishably displayed.

To be specific, FIG. 9A shows an example in which when a main pop-up window is focused by being selected by the viewer, the main pop-up window is displayed largest, and two sub pop-up windows are displayed to be smaller step by step. That is, among non-focused two sub pop-up windows, a first sub pop-up window is displayed larger than a second sub pop-up window.

FIG. 9B shows an example in which when a second sub pop-up window is focused by being selected by the viewer, the second sub pop-up window is displayed largest, and a main pop-up window and a first sub pop-up window are displayed to be larger step by step. In other words, the non-focused first sub pop-up window is displayed larger than the main pop-up window.

Although not shown in the drawings, the focused pop-up window may be displayed brighter, while the other pop-up windows are displayed darker. In addition, pop-up windows may be displayed so as to partially overlap each other, and among the overlapping pop-up windows, the pop-up window selected by the viewer may be displayed in the top layer.

B-2. Second Embodiment

Figure 4:
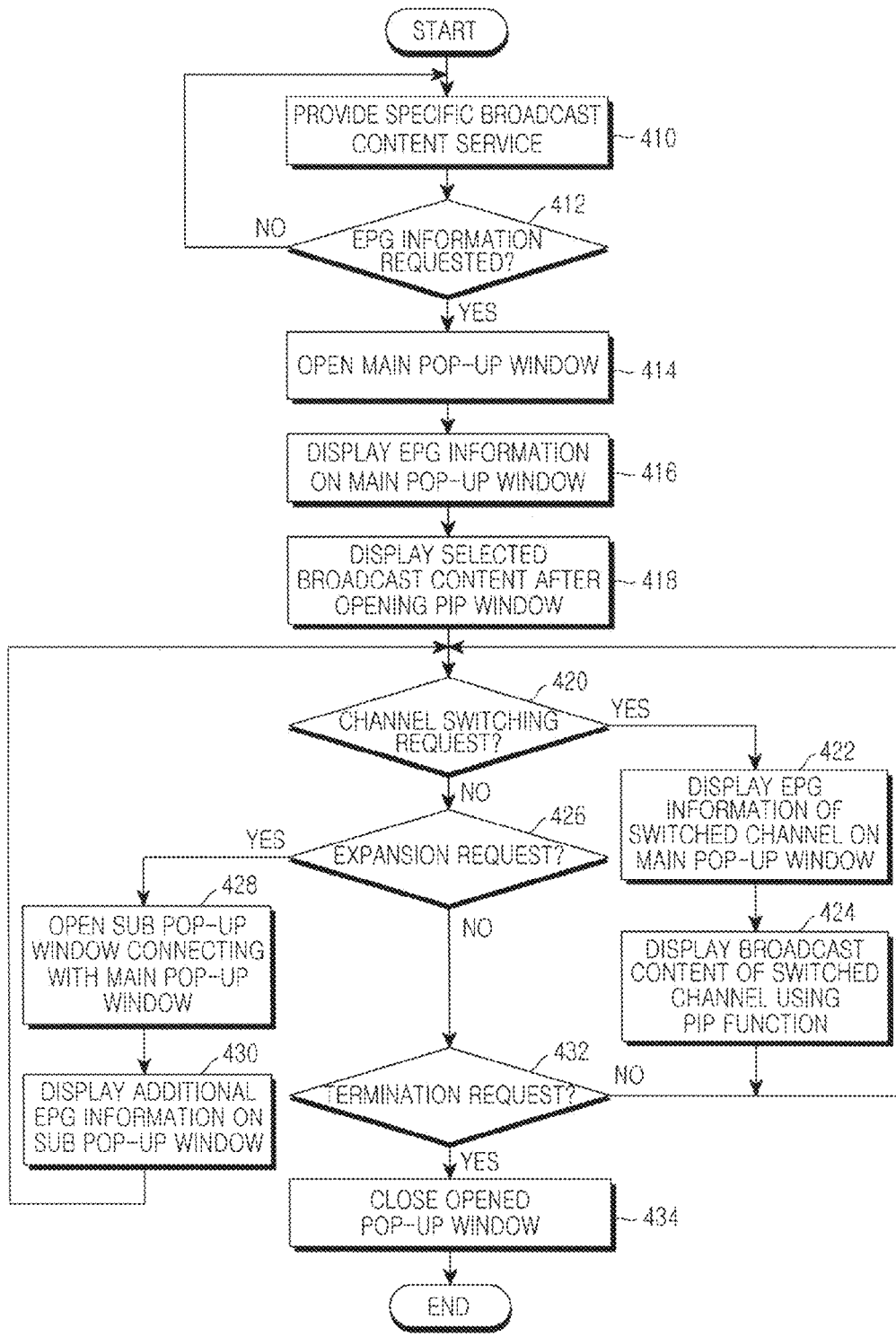
FIG. 4 is a flowchart showing a control flow for displaying EPG information in a digital broadcast receiver according to another embodiment of the present invention.

FIG. 4 shows a control flow for displaying EPG information in a digital broadcast receiver according to another embodiment of the present invention.

Referring to FIG. 4, in step 410, a digital broadcast receiver provides a service for specific broadcast content requested by a viewer. The digital broadcast receiver monitors in step 412 whether a request for EPG information is received from the viewer in a situation where the service for the specific broadcast content is being provided.

If the request for EPG information is received from the viewer, the digital broadcast receiver opens a main pop-up window in step 414. Subsequently, the digital broadcast receiver displays EPG information on the opened main pop-up window in step 416. The displayed EPG information might be EPG information about the broadcast content that is currently being serviced on the full screen.

While opening the main pop-up window or displaying EPG information on the main pop-up window, the digital broadcast receiver opens a PIP window for providing a PIP function and provides a broadcast content service corresponding to the EPG information displayed on the main pop-up window using the opened PIP window, in step 418.

Figure 5A:
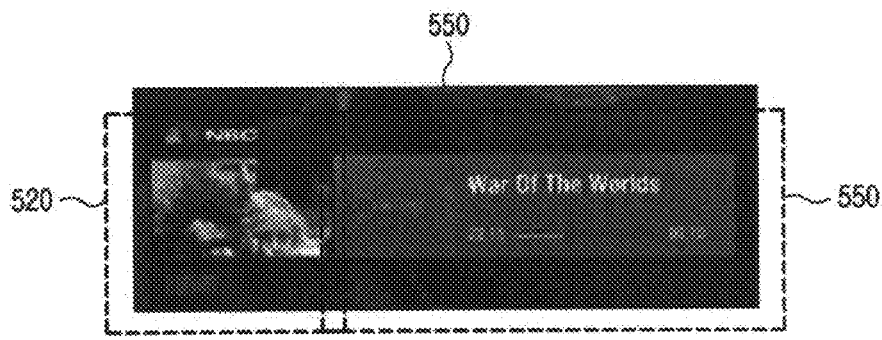
FIGS. 5A to 5D are diagrams showing examples of displaying mini EPG information in a digital broadcast receiver according to another embodiment of the present invention.

FIG. 5A shows an example in which a main pop-up window 510 and a PIP window 520 are opened on a full screen 550 on which specific broadcast content is being displayed by the digital broadcast receiver, mini EPG information is displayed on the opened main pop-up window 510, and broadcast content corresponding to the EPG information displayed on the main pop-up window 510 is displayed on the opened PIP window 520.

It can be appreciated in FIG. 5A that on the main pop-up window are displayed "War of The Worlds" indicating the broadcast content currently being serviced and information indicating the current progress of the service. That is, it is displayed that "War of The Worlds" is the broadcast content that is to be provided in the current channel from 22:15 to 00:10. On the PIP window 520 is displayed the broadcast content "War of The Worlds" corresponding to the EPG information displayed on the main pop-up window 510. In the example shown in FIG. 5A, the main pop-up window 510 and the PIP window 520 are located in the left bottom of the full screen 550.

The digital broadcast receiver monitors in step 420 whether a channel switching request is received from the viewer, monitors in step 426 whether expansion of the pop-up window is requested by the viewer, and monitors in step 432 whether termination of the function for providing EPG information is requested by the viewer.

If the channel switching is requested in step 420, the digital broadcast receiver displays, on the main pop-up window, EPG information about the broadcast content provided in the channel, switching to which is requested by the viewer, in step 422. That is, the digital broadcast receiver changes EPG information displayed on the main pop-up window upon the viewer's request.

In step 424, the digital broadcast receiver displays broadcast content corresponding to the changed EPG information on the opened PIP window using the PIP function.

In steps 420 to 424, the digital broadcast receiver repeatedly changes EPG information displayed on the main pop-up window in response to the viewer's channel switching request, and changes broadcast content displayed on the PIP window according to the changed EPG information.

If an expansion request for the pop-up window is received from the viewer in step 426, the digital broadcast receiver opens a sub pop-up window expanding from the main pop-up window in step 428. The expansion of the sub pop-up window may be made in any one of the top, bottom, left and right directions of the opened main pop-up window or sub pop-up window.

In step 430, the digital broadcast receiver displays additional EPG information on the opened sub pop-up window. New EPG information to be displayed on the newly opened sub pop-up window may be defined in various ways. Typically, the new EPG information may include EPG information about broadcast content to be provided next in the channel providing the broadcast content corresponding to the EPG information displayed on the main pop-up window. As another example, the new EPG information may include more detailed EPG information regarding the broadcast content corresponding to the EPG information displayed on the main pop-up window.

Figure 5B:
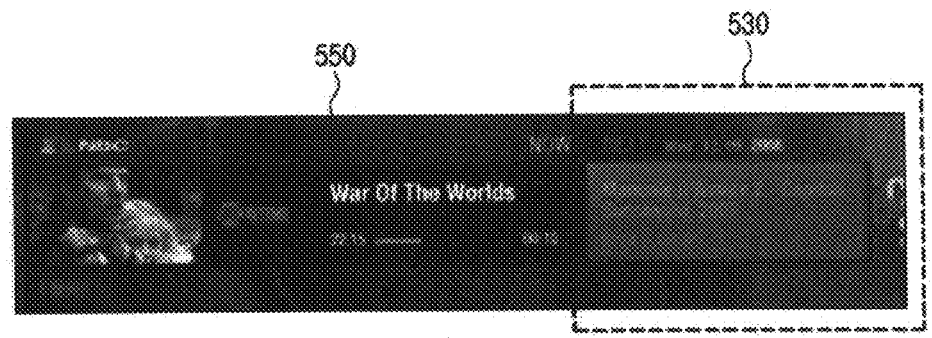

FIG. 5B shows an example in which a first sub pop-up window 530 expands from the main pop-up window upon request of the viewer. According to FIG. 5B, on the first sub pop-up window 530 expanding from the main pop-up window is displayed schedule information indicating that broadcast content corresponding to the EPG information displayed on the main pop-up window is to be serviced next.

By repeating steps 426 to 430, the digital broadcast receiver may open a plurality of sub pop-up windows and provide different EPG information on each of the opened sub pop-up windows.

Figure 5C:
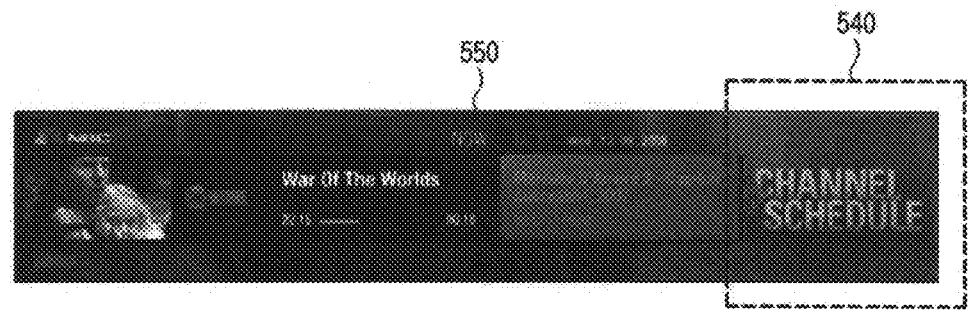

FIG. 5C shows an example in which after EPG information is displayed on a first sub pop-up window, a second sub pop-up window 540 for displaying new EPG information is expanded upon the viewer's request. According to FIG. 5C, on the second sub pop-up window 540 expanding from the first sub pop-up window is displayed schedule information indicating broadcast content to be provided later in the channel providing the broadcast content corresponding to the EPG information displayed on the main pop-up window. That is, as to EPG information to be displayed on the second sub pop-up window 540, information about broadcast content to be provided later in the channel presently providing the broadcast content is sequentially displayed in order of scheduled time. The second sub pop-up window 540 may be set to display all or part of the broadcast content to be provided in the channel, at stated periods or at random.

Figure 5D:
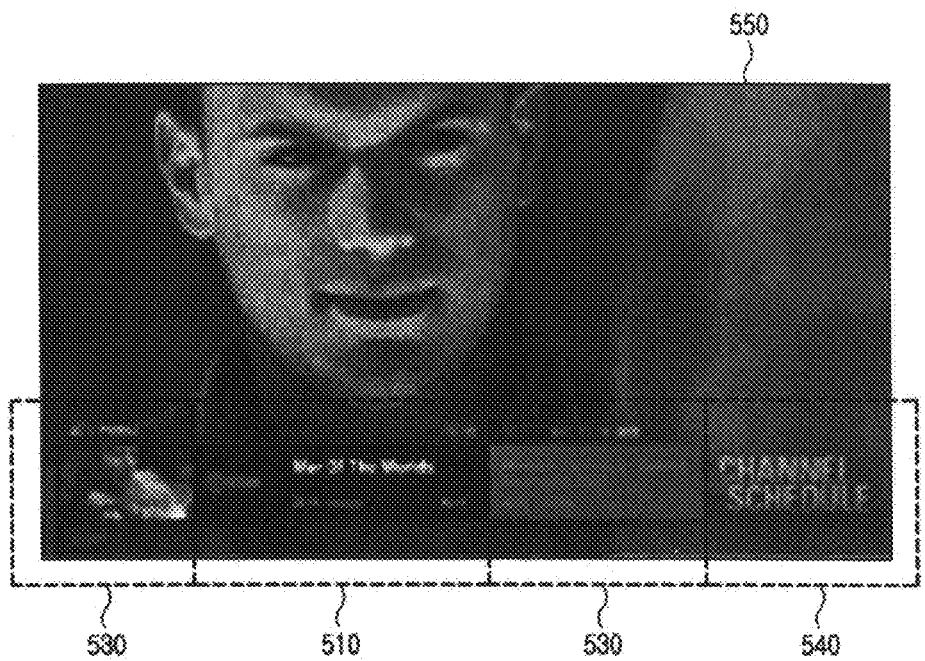

FIG. 5D shows an example in which EPG information is all provided on a full screen 550 through a main pop-up window 510 and two sub pop-up windows 530 and 540, and broadcast content corresponding to the EPG information displayed on the main pop-up window 510 is provided on a PIP window 520, according to another embodiment of the present invention.

If termination of the function providing EPG information is requested by the viewer in step 432, the digital broadcast receiver closes all of the presently opened pop-up windows in step 434. However, with a plurality of pop-up windows open, the digital broadcast receiver may sequentially close the pop-up windows in reverse order of being opened, upon request of the viewer.

The examples shown in FIGS. 8A to 8C and FIGS. 9A and 9B may be applied in the same way to the pop-up windows and PIP window displayed according to another embodiment of the present invention.

B-3. Additional Function

Figure 6:
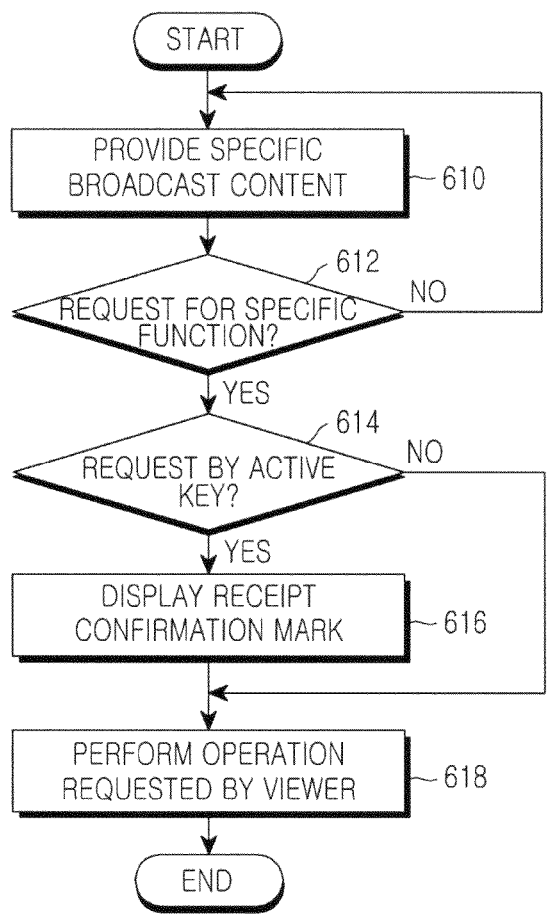
FIG. 6 is a flowchart showing a control flow for confirming a key input in a digital broadcast receiver according to an embodiment of the present invention.

FIG. 6 shows a control flow for confirming a key input in a digital broadcast receiver according to an embodiment of the present invention.

Referring to FIG. 6, a digital broadcast receiver provides specific broadcast content requested by a viewer in step 610, and monitors in step 612 whether a request for a specific function is received from the viewer. The request for a specific function from the viewer may be made in a variety of ways. Typically, the request for a specific function may be made by means of a remote controller, and/or a function key provided in the digital broadcast receiver.

If the request for a specific function is received from the viewer in step 612, the digital broadcast receiver determines in step 614 whether the request has been made by an input of an active key. The request made by an input of an active key is equivalent to requesting an operation that requires a predetermined processing delay time in performing the function by means of the digital broadcast receiver. A threshold time to recognize the active key is required, and the threshold time may be set according to the need.

If the request by an input of an active key is received in step 614, the digital broadcast receiver displays on the screen a request receipt confirmation mark indicating normal receipt of the request from the viewer in step 616, and performs the operation requested by the viewer in step 618.

Figure 7A:
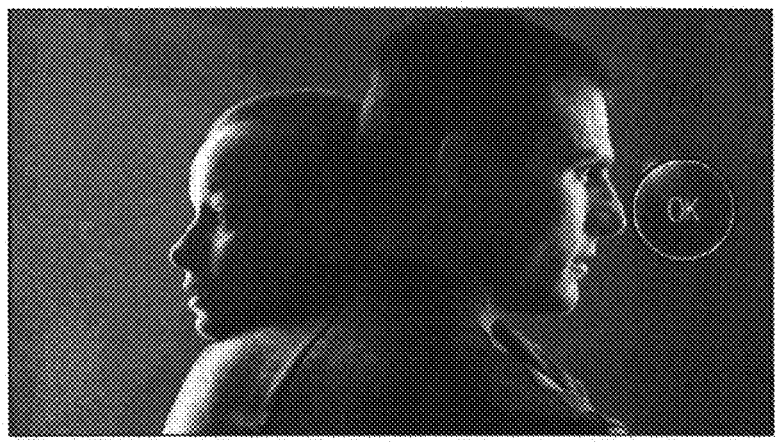
FIGS. 7A and 7B are diagrams showing examples of displaying a request receipt confirmation mark in a digital broadcast receiver according to an embodiment of the present invention.
Figure 7B:
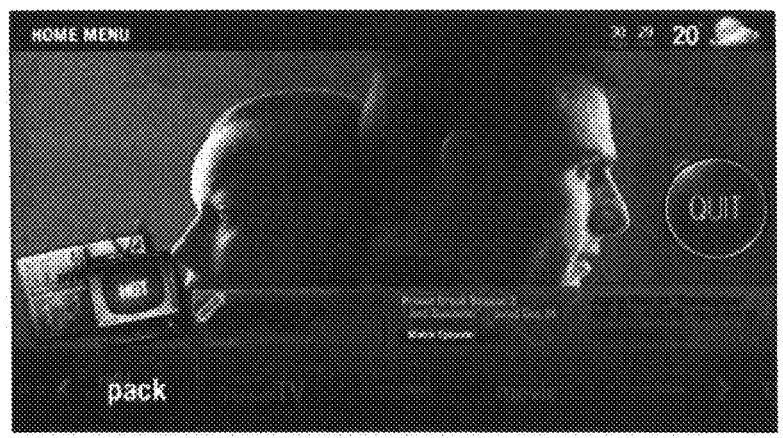

FIGS. 7A and 7B show examples of displaying a request receipt confirmation mark in a digital broadcast receiver according to an embodiment of the present invention.

FIG. 7A shows an example in which in a situation where specific broadcast content is being provided on the full screen in the digital broadcast receiver, a receipt confirmation mark 710 is displayed on the screen if an active key is input by the viewer. For example, "OK" indicating normal receipt of the request from the viewer is used as the receipt confirmation mark 710.

FIG. 7B shows an example in which in a situation where a mini EPG function is being performed in the digital broadcast receiver together with specific broadcast content, a receipt confirmation mark 720 is displayed on the screen if an active key is input by the viewer. For example, "QUIT" indicating normal receipt of a request for a specific function from the viewer is used as the receipt confirmation mark 720.

As is apparent from the foregoing description, the digital broadcast receiver according to exemplary embodiments of the present invention displays EPG information on a plurality of pop-up windows supporting a mini EPG function on a step-by-step basis upon request of the viewer, thereby allowing the viewer to easily search for desired EPG information and facilitating easy selection of broadcast content the viewer wants to watch.

In addition, the digital broadcast receiver displays broadcast content corresponding to specific EPG information on a PIP window together with the EPG information using the PIP function, thereby facilitating convenient selection of broadcast content the viewer wants to watch.

Besides, if a specific function requiring a processing delay time of a predetermined time or more is requested by the viewer, the digital broadcast receiver enables the viewer to recognize normal receipt of the request before the requested function is performed.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, it has been described that in exemplary embodiments of the present invention, a main pop-up window and a plurality of sub pop-up windows are disposed at the bottom of the full screen, but the disposition of the pop-up windows is subject to change.

In addition, it has been described that in exemplary embodiments of the present invention, a main pop-up window and a plurality of sub pop-up windows are expanded to be coupled to one another, but they may be disposed at independent positions without being coupled. In other words, the pop-up windows may exist independently at separate positions without having a coupled relationship.

What is claimed is:

1. A method for providing Electronic Program Guide (EPG) information in a digital broadcast receiver, comprising:
    upon receipt of a request for EPG information from a viewer in a situation where specific broadcast content is being broadcasted, activating at least one pop-up window in a partial region of a full screen, and displaying at least one of the specific broadcast content and EPG information about broadcast content selected by the viewer, on each of the activated at least one pop-up window, wherein the at least one pop-up window is sequentially opened or closed by the request of the viewer; and
    displaying a Picture-In-Picture (PIP) window after the at least one pop-up window has been activated and connecting a first side of the PIP window to a second side of the at least one pop-up window, the second side being adjacent to the first side, and the PIP window being configured to display video content that is being broadcasted.

2. The method of claim 1, wherein the displaying comprises:

monitoring whether a request for EPG information is received from the viewer in the situation where specific broadcast content is being broadcasted;

upon receipt of a request for EPG information from the viewer, opening a main pop-up window in a partial region of the full screen on which the specific broadcast content is being broadcasted, and displaying EPG information about the specific broadcast content or the broadcast content selected by the viewer, on the main pop-up window;

upon receipt of an expansion request from the viewer with the main pop-up window open, opening a new first sub pop-up window connecting with the main pop-up window, and displaying additional EPG information on the first sub pop-up window; and upon additional receipt of an expansion request from the viewer with the first sub pop-up window open, opening a new second sub pop-up window connecting with the first sub pop-up window, and displaying, on the second sub pop-up window, schedule information of a channel providing broadcast content corresponding to the EPG information displayed on the main pop-up window;

wherein at least one sub pop-up window may expand additionally.

3. The method of claim 2, wherein the main pop-up window, the first sub pop-up window and the second sub pop-up window are spread rightward in a partial region of a left bottom on the full screen.

4. The method of claim 3, further comprising displaying on the PIP window broadcast content corresponding to EPG information about the specific broadcast content displayed on the main pop-up window.

5. The method of claim 2, wherein on the main pop-up window is initially displayed EPG information about the specific broadcast content, and then is displayed EPG information about current broadcast content of a channel that is sequentially changed upon a channel switching request of the viewer.

6. The method of claim 5, wherein if the EPG information displayed on the main pop-up window is changed upon request of the viewer, the broadcast content displayed on the full screen or the PIP window is replaced with broadcast content corresponding to the changed EPG information.

7. The method of claim 2, wherein the additional EPG information displayed on the first sub pop-up window includes at least one of EPG information about broadcast content to be broadcasted next in a channel providing broadcast content corresponding to the EPG information displayed on the main pop-up window EPG information about broadcast content similar in type to broadcast content corresponding to the EPG information displayed on the main pop-up window, and EPG information that is more detailed than the EPG information displayed on the main pop-up window.

8. The method of claim 2, further comprising sequentially displaying information about next broadcast content of a channel providing broadcast content corresponding to the EPG information displayed on the main pop-up window on the second sub pop-up window upon request of the viewer, and displaying full broadcast schedule of the channel at stated periods while sequentially displaying the information about the next broadcast content.

9. The method of claim 2, further comprising, upon receipt of an active key requiring a processing delay time by the digital broadcast receiver from the viewer, displaying a mark indicating normal receipt of the active key in a designated region of the full screen.

10. The method of claim 2, wherein at least one of the main pop-up window, the first and second sub pop-up windows and other expanded sub pop-up windows are activated to be displayed larger or brighter than others upon request of the viewer.

11. A digital broadcast receiver for providing Electronic Program Guide (EPG) information, comprising:

a user interface unit for monitoring whether a request for EPG information is received from a viewer in a situation where specific broadcast content is being broadcasted;

an information processor configured to, upon receipt of a request for EPG information from the viewer in the situation where specific broadcast content is being broadcasted, activate at least one pop-up window in a partial region of a full screen and display at least one of the specific broadcast content and EPG information about broadcast content selected by the viewer, on each of the activated at least one pop-up window, display a PIP window after the at least one pop-up window has been activated, and connect a first side the PIP window to a second side of the at least one pop-up window, the second side being adjacent to the first side; and a display for displaying EPG information provided from the information processor, wherein the at least one pop-up window is sequentially opened or closed by the request of the viewer; and wherein the PIP window is configured to display video content that is being broadcasted.

12. The digital broadcast receiver of claim 11, wherein the information processor includes;

controlling the display to open a main pop-up window in a partial region of the full screen on which the specific broadcast content is being broadcasted, and display EPG information about the specific broadcast content or broadcast content selected by the viewer, on the main pop-up window;

controlling the display to open a first sub pop-up window connecting with the main pop-up window upon receipt of an expansion request from the viewer with the main pop-up window open, and display additional EPG information on the first sub pop-up window; and controlling the display to open a new second sub pop-up window connecting with the first sub pop-up window upon additional receipt of an expansion request from the viewer with the first sub pop-up window open, and display, on the second sub pop-up window, schedule information about a channel providing broadcast content corresponding to the EPG information displayed on the main pop-up window.

13. The digital broadcast receiver of claim 12, wherein the display displays the main pop-up window, the first sub pop-up window and the second sub pop-up window so as to be spread rightward in a partial region of a left bottom on the full screen.

14. The digital broadcast receiver of claim 13, wherein the information processor controls the display to display on the PIP window broadcast content corresponding to EPG information about the specific broadcast content, which is displayed on the main pop-up window.

15. The digital broadcast receiver of claim 12, wherein the information processor controls the display to initially display EPG information about the specific broadcast content on the main pop-up window, and then display thereon EPG information about current broadcast content of a channel that is sequentially changed upon a channel switching request of the viewer.

16. The digital broadcast receiver of claim 15, wherein if the EPG information displayed on the main pop-up window is changed upon request of the viewer, the information processor controls the display to replace the broadcast content displayed on the full screen or the PIP window with broadcast content corresponding to the changed EPG information.

17. The digital broadcast receiver of claim 12, wherein the additional EPG information displayed on the first sub pop-up window includes at least one of EPG information about broadcast content to be broadcasted next in a channel providing broadcast content corresponding to the EPG information displayed on the main pop-up window, EPG information about broadcast content similar in type to broadcast content corresponding to the EPG information displayed on the main pop-up window, and EPG information that is more detailed than the EPG information displayed on the main pop-up window.

18. The digital broadcast receiver of claim 12, wherein the information processor controls the display to sequentially display information about next broadcast content of a channel providing broadcast content corresponding to the EPG information displayed on the main pop-up window on the second sub pop-up window upon request of the viewer, and display full broadcast schedule of the channel at stated periods while sequentially displaying the information about the next broadcast content.

19. The digital broadcast receiver of claim 12, wherein upon receipt of an active key requiring a processing delay time by the digital broadcast receiver from the viewer, the information processor controls the display to display a mark indicating normal receipt of the active key in a designated region of the full screen.

20. The digital broadcast receiver of claim 12, wherein upon request of the viewer, the display activates at least one of the main pop-up window, the first and second sub pop-up windows and other expanded sub pop-up windows so as to be displayed larger or brighter than others.

* * * * *